United States Patent [19]
Liebert et al.

[11] Patent Number: 5,314,247
[45] Date of Patent: May 24, 1994

[54] DUAL ACTIVE SURFACE, MINIATURE, PLUG-TYPE HEAT FLUX GAUGE

[75] Inventors: Curt H. Liebert, Middleburg Heights; John Koch, Jr., Medina, both of Ohio

[73] Assignee: The United States of America as represented by the Administrator of the National Aeronautics & Space Administration, Washington, D.C.

[21] Appl. No.: 47,120

[22] Filed: Apr. 16, 1993

[51] Int. Cl.$^5$ ............................................. G01K 17/00
[52] U.S. Cl. .................................... 374/29; 374/166
[58] Field of Search ................. 374/29, 30, 31, 43, 374/44, 166, 179

[56] References Cited

U.S. PATENT DOCUMENTS

| | | | |
|---|---|---|---|
| 3,372,588 | 3/1968 | Ziemke et al. | 374/29 |
| 4,577,976 | 3/1986 | Hayashi et al. | 375/29 |
| 4,722,609 | 2/1988 | Epstein et al. | 374/30 |
| 4,779,994 | 10/1988 | Diller et al. | 374/30 |
| 4,812,050 | 3/1989 | Epstein et al. | 374/1 |
| 5,044,765 | 9/1991 | Noel et al. | 374/30 |
| 5,048,973 | 9/1991 | Liebert et al. | 374/29 |
| 5,086,204 | 2/1991 | Liebert et al. | 219/69.17 |

FOREIGN PATENT DOCUMENTS

| | | | |
|---|---|---|---|
| 2329164 | 1/1974 | Fed. Rep. of Germany | 374/30 |
| 60-201224 | 3/1984 | Japan . | |
| 1171674 | 8/1985 | U.S.S.R. | 374/29 |
| 1297514 | 11/1972 | United Kingdom | 374/30 |
| 1403950 | 8/1975 | United Kingdom | 374/30 |

OTHER PUBLICATIONS

Leclercq, D., et al., "Apparatus for Simultaneous Temperature and Heat-Flow Measurements Under Transient Conditions," Rev. Sci. Instrum. 54(3), pp. 374-380 (Mar. 1983).

Beda, G. A., et al, "Graphite Calorimeter," High Temp. (USA) vol. 10, No. 2 (Mar.-Apr. 1972).

Product Engineering, vol. 35, No. 26, p. 45 (Dec. 21, 1964).

*Primary Examiner*—Diego F. F. Gutierrez
*Attorney, Agent, or Firm*—Gene E. Shook; Guy M. Miller; James A. Mackin

[57] ABSTRACT

A plug-type heat flux gauge can simultaneously measure heat flux on two opposite surfaces of thick or very thin convection or impingement cooled metal walls. The gauge is capable of continuously measuring transient and steady heat flux under transient and steady state gauge temperature operating conditions. The length of the gauge extends through the entire thickness of the material. A non-linear temperature gradient through the gauge can be measured by attaching 3-5 thermocouples along the length of the gauge.

12 Claims, 3 Drawing Sheets

DUAL ACTIVE SURFACE, MINIATURE, PLUG-TYPE HEAT FLUX GAUGE

ORIGIN OF THE INVENTION

The invention described herein was made by employees of the U.S. Government and may be manufactured and used by or for the Government for governmental purposes without the payment of any royalties thereon or therefor.

FIELD OF THE INVENTION

This invention relates generally to heat flux gauges. The invention is particularly directed to a durable, miniature plug type heat flux gauge which can simultaneously measure heat flux on two opposite surfaces.

Gauges are required to obtain experimental surface heat flux and temperature data in convection cooled apparatus for the verification of theoretical aerodynamic, heat transfer, and durability models. These heat flux gauges are required for use over a wide range of transient and steady heat flux between about 0.01 MW/m$^2$ to about 20 MW/m$^2$. These gauges are also required to measure heat flux over a wide steady-state and transient range of gauge and external environmental temperatures between about 90 K to about 1400 K and pressures between about 0.3 MPa to about 14 MPa.

Much of the prior art heat flux measurement is based on two general sensor configurations. These are (1) plug-type and (2) solid wall. Single active surface plug-type heat flux gauges of the first type are used for measuring transient and steady heat flux on only one surface exposed to heat from radiative, conductive, and/or convective heat transfer environments. These gauges are described in the Applicants' prior U.S. Pat. Nos. 5,048,973 and 5,086,204. The plug-type gauge described in these two patents is useful only at transient temperature conditions.

The second gauge configuration of the solid wall type is fabricated by attaching thermocouples or thermopiles to the outer hot and cold surfaces of solid convection cooled metal walls. The measured temperatures are used to determine steady heat flux on two surfaces at only steady-state temperature conditions.

The disadvantage of the single active surface plug type heat flux gauge described in the Applicants' two prior patents is that it can only measure heat flux at one surface. This limitation arises because the thermoplug back surface is separate from a back cover. Thermal insulating air occupies the space between the back cover and the back of the thermoplug. Thus, heat cannot be readily transferred from the end of the thermoplug to the back cover or back surface of the gauge. Therefore, heat flux on the back surface cannot be measured.

Another disadvantage is the single active surface plug-type gauge is not applicable to the measurement of steady heat flux at steady or constant temperature conditions. More particularly, the single active surface plug-type gauge is used to measure steady heat flux only when the temperatures measured within the gauge are changing with time. This renders the single active surface gauge ineffective for heat flux measurement over a continuous transient and steady state operating temperature range.

Still another problem is encountered because the thermoplug is insulated and the single active surface gauge can cause local hot spots in the walls within which the gauge is fabricated. If the hot spot is too severe, the accuracy and durability of the gauge is diminished.

The solid wall gauge is fabricated by attaching temperature sensors to the two outer surfaces of a solid convection cooled wall. Unfortunately, the durability of temperature measurement sensors attached to the outer surface is reduced when these surfaces are exposed to hostile environments, such as high pressure, velocity and temperature environments within which abrasive materials are flowing. For the solid wall gauge, heat flux is obtained by multiplying the value of measured steady-state wall surface temperature difference by a single value of material thermal conductivity evaluated at an average wall temperature. Thus, for such a wall gauge, it is difficult to assess the heat flux measurement accuracy because the temperature gradient within the wall, and thus the gauge, is not measured. Instead, this temperature gradient is assumed as a straight line extending through the material from one wall to the other. It is well known that this physical assumption is fundamentally incorrect because the line describing a temperature gradient is, in fact, curved. It has been shown experimentally that this linear assumption is especially inaccurate during transient heating and cooling conditions and at steady state cooling conditions where steady wall temperature differences are moderately large.

It is, therefore, an object of the present invention to simultaneously measure heat flux on two opposite surfaces of thick or very thin convection and radiatively cooled metal walls.

Another object of the invention is to provide a plug-type heat flux gauge that is fabricated into a metal wall with its two external active surfaces flush with the two opposite metal wall surfaces.

Still another object of the invention is to provide a miniature plug-type heat flux gauge which can simultaneously measure heat flux on opposite surfaces which may be either flat or curved.

Still another object of the invention is to provide a miniature plug-type heat flux gauge which can continuously measure transient and steady heat flux under transient and steady-state gauge temperature operating conditions.

BACKGROUND ART

Epstein et al U.S. Pat. Nos. 4,722,609 and 4,812,050 disclose a heat flux gauge which facilitates simultaneous measurement of both steady state and time resolved heat flux distributions. The configuration comprises a double-sided, high frequency response heat flux gauge comprising a metal film which is applied to both sides of a thin polyimide sheet. At low frequencies, the temperature difference between the polyimide sheet is a direct measure of the heat flux. At higher frequency, a quasi-one-dimensional assumption is used to infer the heat flux.

Japanese publication No. 60-201224 to Hayashi describes a heat conduction gauge which employs heat flux sensors. These sensors comprise heat resistance thin film and resistance thermometer element metallic thin films adhered to the top and reverse surfaces to calculate heat flux directly.

DISCLOSURE OF THE INVENTION

The aforementioned objects have been achieved by a plug-type heat flux gauge constructed in accordance with the present invention which can simultaneously measure heat flux on two opposed surfaces of thick or very thin convection and radiatively cooled metal walls. Heat flux can be measured over a continuous transient and steady-state temperature operating range. Because all these features are incorporated into a single device, the gauge is applicable to convection and radiatively cooled apparatus over a wide range of operating conditions. Examples of such apparatus include air-cooled turbines, nozzles, and combustors and gas turbine engines, air cooled flat plates used in aeronautical and heat transfer research and air cooled propulsion exhaust system for supersonic short takeoff, vertical landing aircraft.

The length of the gauge extends through the entire thickness of the material. A non-linear temperature gradient through the gauge can be measured by attaching 3-5 thermocouples along the length of the gauge. Knowing the temperature gradient through the gauge provides for a more accurate determination of the heat flux on both surfaces. Another advantage is that the cooling of one of the active surfaces of the gauge can reduce the inherent hot spot caused by the device.

DESCRIPTION OF THE DRAWINGS

The objects, advantages, and novel features of the invention will be more fully apparent from the following detailed description when read in connection with the accompanying drawings wherein like numerals are used throughout to identify like parts.

BEST MODE FOR CARRYING OUT THE INVENTION

Figure 1:
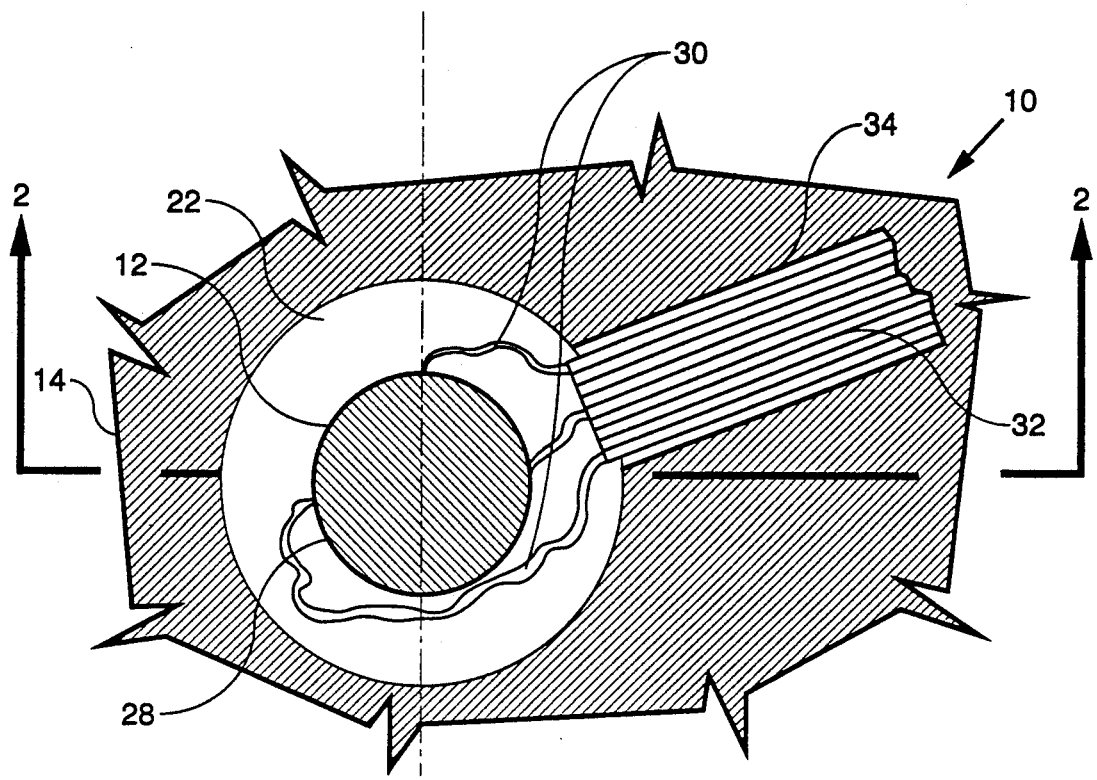
FIG. 1 is a back view of a plug-type heat flux gauge constructed in accordance with the present invention which has the cover removed.
Figure 2:
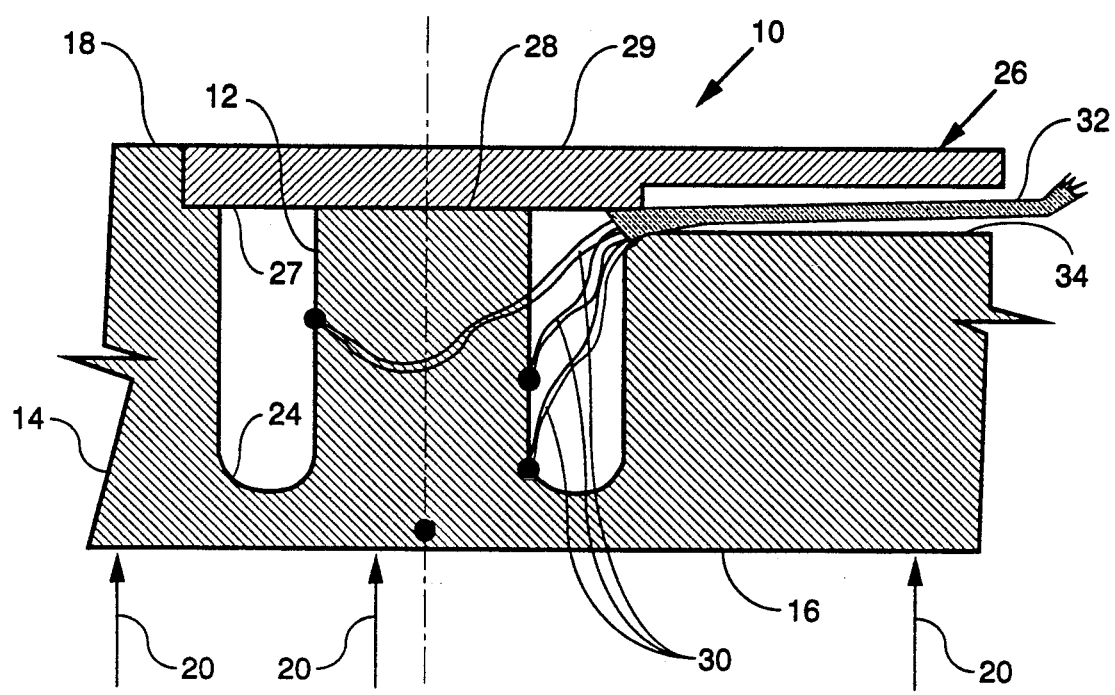
FIG. 2 is a section view taken along the line 2—2 in FIG. 1.

Referring now to the drawings there is shown in FIGS. 1 and 2 a dual active surface plug-type heat flux gauge 10 constructed in accordance with the present invention. A thermoplug 12 is integral with the material specimen 14. The thermoplug 12 is formed in accordance with the teachings of U.S. Pat. No. 5,086,204.

The material specimen 14 has a front surface 16 which is the lower surface in FIG. 1 and a back surface 18 which is the upper surface in FIG. 1. The front surface 16 of the material specimen 14 is exposed to an energy source, such as an arc lamp, for radiating incident thermal radiation 20. The back active surface 18 is exposed to a cooling medium, such as cool air, flowing rapidly along the back active surface.

The dual active surface heat flux gauge 10 will measure the heat flux to the front active surface 16 as it is heating, and at the same time will measure the heat flux on the back active surface 18 as it is cooling. The thermoplug 12 is insulated on the side surface and, therefore, heat transfer within the thermoplug 12 may be assumed to be one-dimensional.

A concentric annulus 22 surrounds the side of the cylindrical thermoplug 12, as shown in FIGS. 1 and 2. Because the concentric annulus 22 is formed only partially through the material specimen 14, a floor 24 of the concentric annulus 22 is formed a finite distance from the front surface 16 of the material specimen 14, as shown in FIG. 2. Because the front of the gauge and thermoplug 12 are an integral part of the material specimen 14, it is not necessary to provide additional fabrication effort to prepare the material specimen for welding or threading the thermoplug into position. The integral thermoplug structure is also advantageous because there is no seam connecting the thermoplug 12 to the material specimen 14. Such seams can cause measurement errors which are difficult to analyze.

The concentric annulus 22 is formed into the material specimen 14 using any appropriate method, such as trepanning, and electrical discharge machining. Trepanning involves the machining of a circular groove into the material. By way of example, a hole saw or lathe may be used on the material specimen 14 in order to form the concentric annulus 22 as well as the thermoplug 12 integral at the front of the gauge 10 with the material specimen 14. The length of the thermoplug 12 is taken as the distance from the gauge active front surface 16 to the gauge back active surface 18.

A preferred method of forming the concentric annulus 22 into the material specimen 14 utilizes a process known as electrical discharge machining. A plug type heat flux gauge configuration can be fabricated to the very close tolerances required when machining into thin walls. One example of an electrical discharge machining apparatus is described in U.S. Pat. No. 2,818,490 to Dixon et al.

The thermoplug 12 and the concentric annulus 22 are formed by intermittently discharging an electric spark through a gap between the material specimen 14 and an electrode. The material specimen 14 and the electrode are immersed in a dielectric fluid, such as refined kerosene. The electrode which is made from a conductor such as copper-tungsten, includes a bore along its axial length. Sparks are emitted from the electrode and strike the material specimen 14, thereby detaching material. The electrode forms the thermoplug 12 and the concentric annulus 22 as the electrode descends into the material specimen 14. More particularly, the thermoplug 12 is formed within the bore of the electrode.

The concentric annulus 22 is machined only part way through the material specimen 14, thereby forming the thermoplug 12 as an integral part of the material specimen 14 at the front of the gauge. Thermoplugs and annuluses of various sizes and shapes may be formed using this process. By way of example, thermoplug diameters of 0.09 cm to 0.20 cm, thermoplug lengths of 0.14 cm to 0.96 cm and concentric annulus widths of 0.10 cm to 0.18 cm have been formed using electrical discharge machining.

Thus, a dual active surface plug-type heat flux gauge 10, according to the present invention, may be made relatively small compared with the size of conventional water cooled heat flux gauges. Consequently, a dual active surface plug-type heat flux gauge 10 of the present invention may be utilized in measuring heat flux in extremely small or thin material specimens.

Referring now to FIG. 2, a back cover 26 having an inner surface 27 encloses the thermoplug 12 and the concentric annulus 22. The back cover 26 is secured by welding or brazing its inner surface to an end face 28 of the thermoplug 12 in the material specimen 14, thereby trapping a thermal insulator, such as air, within the concentric annulus 22.

The end face 28 is spaced from the back surface 18 of the specimen 14 and an outer surface 29 of the back cover 26. Care is taken that no air is trapped between the thermoplug end face 28 and the back cover 26. The inner surface 27 of the back cover is contiguous with the end face 28. Therefore, heat is transferred nearly one-dimensionally from the front surface 16 through the thermoplug 12 and back cover 26 to its outer surface 29 which is coplanar with and forms an extension of the gauge back active surface 18. The back cover 26 is in the form of a plate and has a thickness typically of about 0.025 cm which is the distance between the inner surface 27 and the outer surface 29. This plate is fabricated from the same material or similar material used in the material specimen 14. By way of example, nickel base alloy specimens 14 have been tested with plates of nickel base alloys and carbon base alloys.

Referring to FIGS. 1 and 2 there is shown a plurality of bare thermocouple wires 30 of small diameter that are obtained from commercial single-thermo elements sheathed thermocouple assemblies 32. These wires are of a commercially available material, known as Chromel-Alumel. A length of about 2 cm to 10 cm of sheathing is stripped to expose bare wire. The ends of these bare wires 30 are spot welded along the length of thermoplug 12 at various distances from the front active surface 16 of the material specimen 14 at spaced locations about the peripheral surface of the thermoplug thereby forming hot junctions. In this manner the temperature gradient through the interior of the gauge may be measured. Welding the wires 30 to the thermoplug surface, rather than embedding them in the material, offers minimum resistance to one dimensional heat flow through the thermoplug 12. The small diameter of each 0.0038 cm bare thermocouple wire minimizes unwanted heat leakage from the thermoplug along the wires 30 and enables the gauge to have a response time of about one millisecond. The wires 30 are routed through the annulus 22 to the rear of the gauge 10. Associated sheathed thermocouple assemblies 32 which are 0.025 cm in diameter are spot welded to the bottom of a groove 34 electrical discharge machined into the specimen material 14.

Heat flux measured on the gauge hot front active surface 16 and the gauge cold back active surface 18 is calculated from measured thermoplug temperatures using a temperature variant thermal property inverse heat conduction method devised for the dual active surface heat flux gauge 10. An equation describing the heat balance on the thermoplug 12 is $$q_{16} = q_{s,12} + q_{18}$$

where the heat stored in the thermoplug 12 is given by the equation $$q_{s,12} = \int_O^L (\rho C_p \delta T/\delta t) dZ$$

This heat storage equation is set out in U.S. Pat. Nos. 5,048,973 and 5,086,204. Numerical procedures for solving this heat storage equation for the heat stored in the thermoplug 12 are described in NASA TM 105403.

Because the back face 28 of the thermoplug 12 is firmly attached to the back cover 26, a second equation must be written to describe the physics of heat flow through the back cover 26. This equation is $$q_{18} = -k \, \alpha T/\alpha Z \text{ at } Z = L$$

This last equation can be numerically solved by differentiating a least-square equation describing the curve of temperature measurement data vs. thermocouple position on the thermoplug 12.

SYMBOLS $C_p$=specific heat at constant pressure, J/kgK
k=thermal conductivity, W/mK
L=length of thermoplug measured from front active surface 16 to back active surface 18, cm
$q_{16}$=heat flux measured on gauge (hot) front active surface 16, MW/m²
$q_{s,12}$=heat stored in volume of thermoplug 12, MW/m²
$q_{18}$=heat flux measured on gauge (cool) back active surface 18, MW/m²
T=temperature, K
t=time, sec
Z=thermocouple position along axis of thermoplug, cm
p=density, kg/m³

Figure 3:
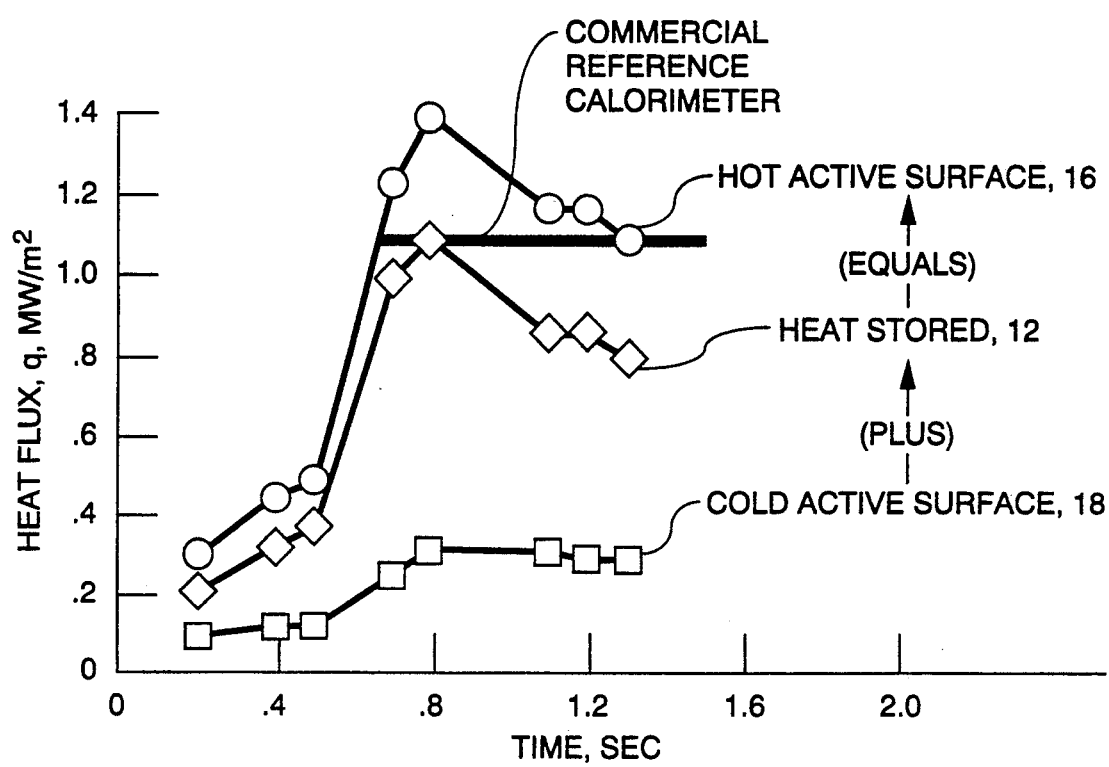
FIG. 3 is a chart of heat flux plotted against time.

Referring now to FIG. 3 there is shown typical heat flux measurements on the active front surface 16 and on the active back surface 18. FIG. 3 shows that the heat flux measured on the hot radiatively heated front surface 16 compares well with heat flux measured with a carefully factory calibrated commercial reference calorimeter. This calorimeter and gauge active front surface 16 were subjected to the same heating conditions.

ALTERNATE EMBODIMENTS OF THE INVENTION

It is contemplated that the gauge 10 can also be used to measure heat flux when either the front active surface 16 is heated and the back active surface 18 is cooled, or when the front surface is cooled and the back surface is heated. The temperatures on the front active surface 16 and back active surface 18 can be evaluated by applying numerical analysis to solve the above three equations. The surface temperatures can be used to determine hot and cold gas-side heat transfer coefficients. Also, the gauge is especially durable in hostile environments because the thermocouples are buried within the gauge configuration.

While a preferred embodiment of the invention has been disclosed and described, it will be appreciated that various structural modifications may be made without departing from the spirit of the invention or the scope of the subjoined claims.

What is claimed is:

1. A dual active surface plug-type heat flux gauge comprising
a metal member having a first surface and a second surface oppositely disposed from said first surface, said member further including an annulus extending away from said second surface towards said first surface,
a thermoplug extending from said first surface toward said second surface through said annulus with a surface of said thermoplug being spaced from a surface of said annulus thereby forming an annular chamber, said thermoplug being integrally formed from a portion of said member in said annulus so that said thermoplug is of the same material as said member with no seam connecting the same, said thermoplug having an end face spaced inwardly from said second surface, a plurality of thermocouple wires extending into said annular chamber, each of said thermocouple wires being in heat conducting contact with said thermoplug at a predetermined point, the spacing between each predetermined point and said first and second surfaces being different for each thermocouple wire, and a metal cover plate covering said annular chamber for insulating said wires and contact points, said plate being contiguous with said end face and permanently secured thereto for transferring heat substantially one-dimensionally from one of said surfaces through said thermoplug and cover plate to the other of said surfaces.

2. A dual active surface plug-type heat flux gauge as claimed in claim 1 wherein the cover plate is made of the same metal as said member.

3. A dual active plug-type heat flux gauge as claimed in claim 2 wherein the cover plate and the member are made of a nickel base alloy.

4. A dual active plug-type heat flux gauge as claimed in claim 1 wherein the cover plate is made of a metal different from the metal member.

5. A dual active plug-type heat flux gauge as claimed in claim 4 wherein the cover plate is made of a carbon base alloy and the member is made of a nickel base alloy.

6. A dual active surface plug-type heat flux gauge as recited in claim 1 wherein said thermoplug is cylindrical and said annulus surrounding said thermoplug is concentric thereto.

7. A dual active surface plug-type heat flux gauge as recited in claim 6 wherein said thermocouple wires are routed through said concentric annulus.

8. A dual active surface plug-type heat flux gauge as recited in claim 1 wherein each of said thermocouple wires forms a hot junction at each of said predetermined points.

9. A dual active surface plug-type heat flux gauge as recited in claim 1 further comprising a thermal insulator within said annular chamber, said cover plate engaging said end face and enclosing said thermoplug and said annular chamber.

10. A dual active surface plug-type heat flux gauge as recited in claim 9 wherein said thermal insulator is a gaseous medium.

11. A dual active surface plug-type heat flux gauge as recited in claim 9 wherein the cover plate is brazed to the end face of the thermoplug.

12. A dual active surface plug-type heat flux gauge as recited in claim 9 wherein the cover plate is molded to the end face of the thermoplug.

* * * * *